G. E. WOODBURY, DEC'D.
A. M. HAINES, ADMINISTRATOR.
VEHICLE WHEEL.
APPLICATION FILED AUG. 3, 1909.

975,378.

Patented Nov. 8, 1910.

2 SHEETS—SHEET 1.

WITNESSES:

INVENTOR

ATTORNEYS

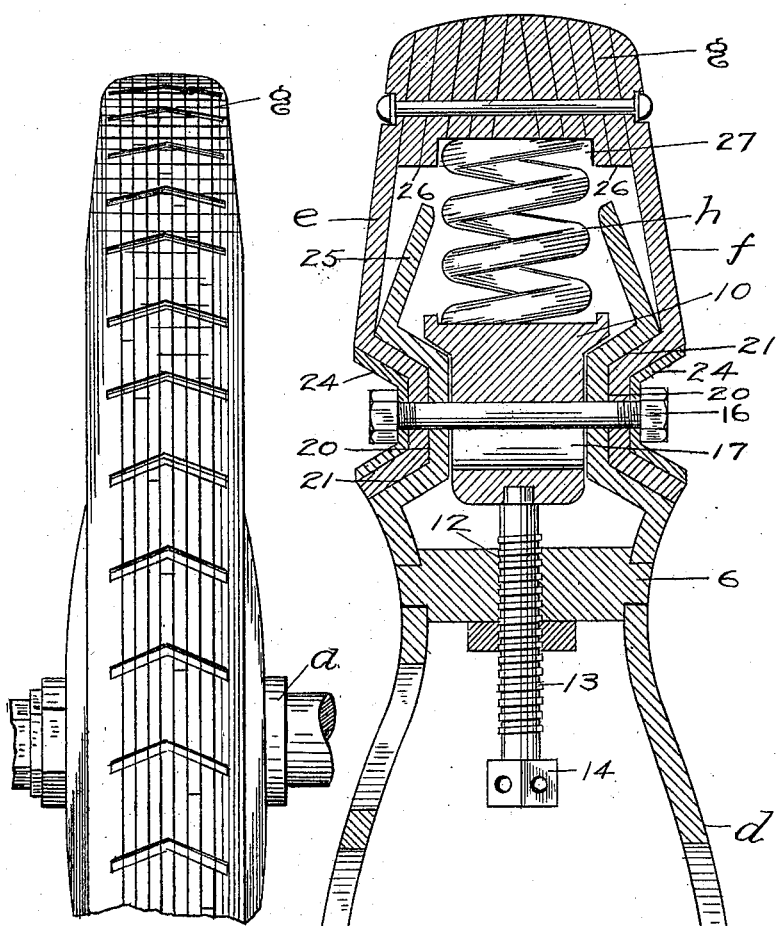

UNITED STATES PATENT OFFICE.

GEORGE E. WOODBURY, OF SAN FRANCISCO, CALIFORNIA; A. M. HAINES ADMINIS-
TRATOR OF SAID GEORGE E. WOODBURY, DECEASED.

VEHICLE-WHEEL.

975,378. Specification of Letters Patent. Patented Nov. 8, 1910.

Application filed August 3, 1908. Serial No. 446,767.

*To all whom it may concern:*

Be it known that I, GEORGE E. WOODBURY, a citizen of the United States, and a resident of the city and county of San Francisco and State of California, have invented new and useful Improvements in Vehicle-Wheels, of which the following is a specification.

This invention relates to the production of an improved wheel suitable for an automobile or other vehicle having among other useful qualities the desired resiliency without the use of an inflated rubber tire, and a higher degree of durability and a greater freedom from accidents than the inflated tire wheel now in general use.

The resilient vehicle wheel of my invention consists in a novel construction of tire, rim and rim-carrying body, and in the combination thereof with a hub and other parts or members, all as hereinafter more fully described and pointed out in the claims.

The accompanying drawings illustrate an automobile wheel constructed in accordance with the invention and embodying the essential features of the same.

Figure 2:
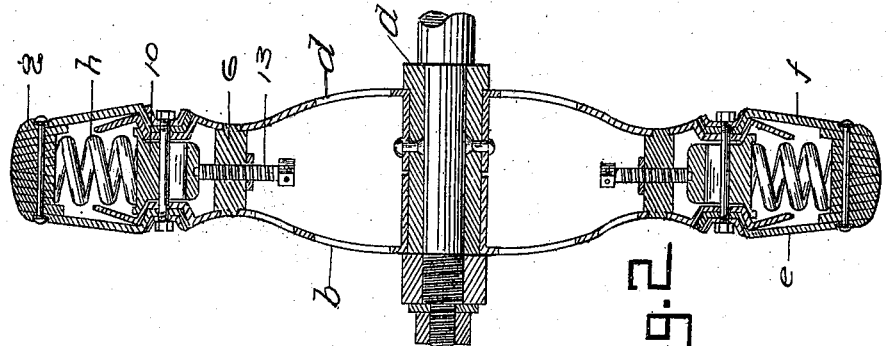
Figure 1:
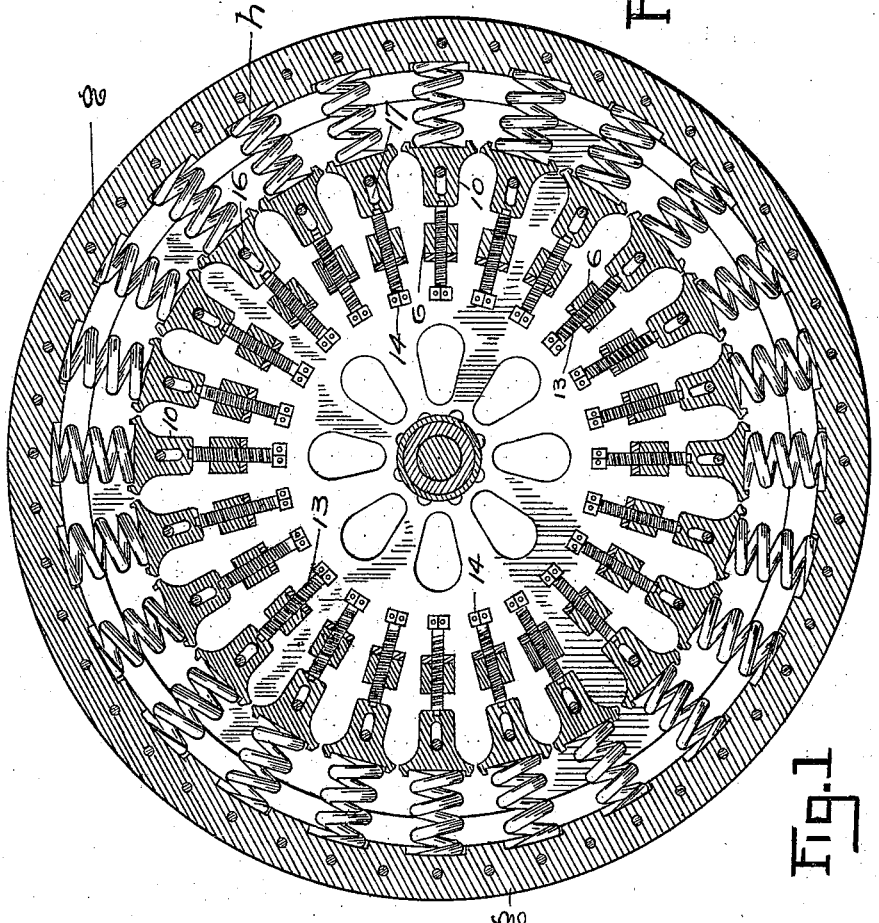

Figure 1 of the drawings represents in sectional view a wheel of my invention, the section being taken diametrically through it in a plane parallel with the faces of the wheel. Fig. 2 is a sectional-view taken on a plane passing transversely through the wheel and longitudinally through the axle. Fig. 3 is a similar transverse sectional view on an enlarged scale and on one side of the axle; the half of the wheel on the opposite side of the hub being omitted. Fig. 4 is a plan or top-view of a portion of the tire and rim.

In the following description of my said invention the several parts of the wheel structure are designated by and will be referred to as the hub *a*, the front center-plate *b* and the back-center plate *d* joining the rim to the hub and forming the web and the felly plates *e—f* composing the rim or that part on which the tire is fixed or carried. In this construction the last mentioned part or member—namely the tire—as in similar resilient wheel constructions already in use—is supported and carried by metallic springs *h* interposed between the inner face of the tire and abutments on the central member of the wheel body, and provision is made for varying the tension or the stiffness of the springs by employing adjustable abutments for the springs.

A novel feature in this wheel is an adjustable abutment block of novel construction in combination with yielding stops or devices for keeping the springs in line and preventing excessive lateral torsion without interfering with their movement axially or radially under compression.

A further novel feature consists in forming or constructing the rim, or felly, or that part which carries the tire, wholly of leather, and in so joining or uniting the parts as to secure the necessary resilient action or effect under the weight of the load, and the proper rigidity or stiffness in the web and rim to insure and maintain the shape and the perpendicularity of the wheel.

As seen in Figs. 2 and 3 the web consists of the two circular plates *b—d* having the same curvilinear shape in transverse section on any line taken diametrically through the web, and preferably formed integral with each plate is a tubular center 2 by which the plate is fixed on an axle skein or bushing 3, the two plates being placed on the bushing back to back, so that the outer plate *b* and the inside plate *d* next to the body of the vehicle when fixed on the bushing 3 are spread apart at the hub, and from its center the web springs inwardly in an even curvature of its opposite sides to the rim or outer circumference to which the tire is joined by the inner and outer felly plates *e—f*. To afford more ready access to the parts inclosed in the web one of the plates forming the web is permanently fixed on the bushing 3 by rivets, but the remaining one—and preferably the front or outer plate *b*—is removably fitted to the bushing, so that it can easily be taken off when access to the parts inclosed between the plates of the web is desired for repairs. A firm fastening for the outer plate *b* is secured by fitting a nut 4 or threaded collar on a screw-thread 5 formed on the outer end of the axle between the usual axle nut provided on the end of the axle and the ends of the axle bushing; the part 4 being of proper diameter to cover the end of the sleeve and extend over the hub 2 of the outer plate *b*.

As the two plates *b d* are of the same size and shape or form they are readily produced in the same dies and afterward set back to back or with the concaved portion of the surfaces turned inwardly producing the neck or contracted part of the web where the two plates are united or joined together by spacing blocks 6. The spacing blocks 6 join the two plates b—d of the web together at intervals all around the circle at the neck or contracted part of the web and each block is provided with a threaded socket for a screw 13 one end of which rests against the back of an abutment block 10 inclosed between the standing sides 25 and the other end is provided with a capstan head 14 or is otherwise shaped to take a wrench. The felly-plates e—f fixed against the standing rim or peripheral edge are formed from flat rings of leather molded to shape by pressure between dies in the same manner as the plates for the web are produced, and are united to the plates b—d at the line of the abutment blocks, by bolts 16 passed through slots 17 in the abutment blocks and through the web and the felly plates at the point of overlapping where both the plates b d and the overlying felly-plates e—f are bent or shaped at the time of molding, each with a double or return angular bend with flaring sides 21 and a flat bottom 20 producing a shallow groove or recess extending around the circle on the line of the abutment blocks and the tie-bolts 16. The bolts 16 serve the purpose of drawing up the sides of the web and the felly-plates at the line of the neck or narrow part of the web.

The angular grooves or recesses in the outer faces of the web and the angular bend or corresponding form or shape in the plate being fitted closely one onto the other have the effect of insuring a better resistance on the part of the felly to the endwise thrust or strain due to the pressure upon the tire in traveling on the surface of the road. But the alternating inward and outward or return bend where the felly plates are joined to the web or body, and the inclined position of the felly-plates from opposite sides toward each other have the effect of preventing lateral spring or movement of the tire to excess without restricting its movement under compression and without the existence of loose joints between the parts, such as necessarily exist between the tire and the web when felly-plates of metal are employed. As a substitute for metal therefore the leather felly-plates have the advantage of allowing the tire to play quite freely on the web or body of the wheel under the weight of the load and at the same time maintain tight joints between the web and the plates and also between the tire and the felly-plates. The last named parts are joined to the parts b—d composing the web by means of tie-bolts 16, and countersunk washer-plates 24 fitted to a close seat on the recessed outer faces of the felly-plates, whereby a tight as well as a stiff-joint is insured at the junction of the felly-plates and the web of the wheel.

The felly-plates formed of leather as described will have all the requisite stiffness and sufficient flexibility, as well as the additional quality of retaining their normal shape or form under the rough usage and the exposure to hard knocks by contact with other vehicles or other obstacles on the road, owing to their greater flexibility, for a much longer time than when such parts of the wheel are composed of sheet metal.

The tire g is constructed preferably of a number of relatively thin layers of leather placed edgewise between the standing sides of the felly-plates e—f and fastened in place by long rivets passed transversely through the plates and the tire and upset or headed on the ends outside; and as embodied in the wheel herein illustrated the leather layers or separate pieces composing the tire are cut to the proper curve as segments of the circle and set to break joints across the face of the tread, so that no two joints will be in line transversely of the tire. The material preferred for the tread or tire and also for the felly-plates in this wheel, is English sole leather of good quality which is found to be readily molded to the required shape under pressure in suitably formed dies.

The metal springs within or behind the tire g are carried by the abutment-blocks 10, in the construction and arrangement of which provision is made for moving them on radial lines and holding them after such adjustment for the purpose of varying the resistance of the springs, by placing behind each block an adjusting screw as already described, and where such adjustment may be desirable or more convenient to be done from the outside, without removing the front-plate of the web, apertures can be formed in the front plate, through which screws 13 can be reached from the outside and turned with a wrench or bar. These apertures can be formed in the center plates either before or after the plates have been subjected to pressure in the shaping dies in the construction of the wheel-body.

I claim:—

1. In a vehicle-wheel, the combination of a hub, a web thereon composed of oppositely set rigid circular plates, felly-plates of leather united to the rim of the web, a tire or tread formed of a plurality of leather segments placed in close order in layers between the felly-plates and fastened in place by rivets passing through the felly-plates and the layers composing the tread and a set of radially disposed springs interposed between the tire and the web.

2. A vehicle-wheel having a web composed of oppositely placed rigid circular plates of curvilinear shape in cross-section, a centrally fixed hub therein, a tire composed of a plurality of layers of leather set edgewise, the felly-plates uniting the tire to the web, composed of annular plates of leather and having the said layers of the tire secured between them, and coiled springs behind the said tire having their outer ends bearing against the back of the tire and stationary supports for the opposite ends of the springs.

3. A vehicle wheel having a hub for the axle, a hollow web composed of oppositely set rigid circular plates secured to the hub, blocks located between the circular plates, at the rim of the web formed thereby, stiff felly plates of leather secured to the outer rim of the web, connecting bolts passing through and uniting the plates of the web, the blocks and the felly plates, a tread between the felly plates and united thereto, and coiled radially arranged springs between the tread and the said blocks.

4. A vehicle wheel having a hub, a web composed of rigid plates, a tread of leather plates, felly-plates of leather uniting the tread and the web, springs behind the tread bearing against the same on radial lines, adjustable supports for the springs and means situated between and protected by the plates of the web for adjusting the supports for the springs.

5. A vehicle wheel having a hub, a web composed of oppositely set rigid plates spaced apart and secured to the hub, stiff felly-plates secured to the outer edges of the rigid plates of the web, respectively, a tread arranged between and secured to the felly-plates, springs having their outer ends bearing against the inner side of the tread, and means for adjusting the tension of the springs located in the space between the rigid plates of the webs; the felly-plates being sufficiently yielding to allow movements of the tread relative to the hub and web of the wheel.

GEORGE E. WOODBURY.

Witnesses:
M. REGNER,
EDWARD E. OSBORN.